United States Patent [19]

Leisner et al.

[11] 3,994,668

[45] Nov. 30, 1976

[54] PROTECTIVELY DOUSED VALVING DEVICE FOR A COMBUSTION CHAMBER

[75] Inventors: Ernst Leisner, Gerlingen; Walter Schildhorn, Offingen, both of Germany

[73] Assignee: Robert Bosch G.m.b.H., Stuttgart, Germany

[22] Filed: Aug. 21, 1975

[21] Appl. No.: 606,447

[30] Foreign Application Priority Data
Aug. 21, 1974 Germany.......................... 2440041

[52] U.S. Cl................................. 431/160; 431/1; 431/346
[51] Int. Cl.² ........................................ F23D 11/36
[58] Field of Search ............... 431/1, 2, 3, 160, 190, 431/346, 158; 266/23 T, 2 R, 215

[56] References Cited
UNITED STATES PATENTS

| | | |
|---|---|---|
| 2,827,112 | 3/1958 | Inskeep ............................... 431/2 R |
| 3,357,472 | 12/1967 | Rhodes et al. .................. 431/346 X |
| 3,851,864 | 12/1974 | Miller................................ 266/23 T |
| 3,892,519 | 7/1975 | Reed et al...................... 431/346 X |

Primary Examiner—Edward G. Favors
Attorney, Agent, or Firm—William R. Woodward

[57] ABSTRACT

After a combustion chamber is filled with a combustion mixture of gases, channels extending upward from the valves for admitting the gas components of the mixture to a gas inlet bore are flooded with a quantity of water injected through an additional valve by a hydraulically driven piston. After the hydraulic pressure behind the piston is turned off, the water chamber in front of the piston is refilled by the inflow of water at water line pressure, which is not sufficiently high enough in pressure to reopen the water outlet valve until the piston is again driven.

8 Claims, 1 Drawing Figure

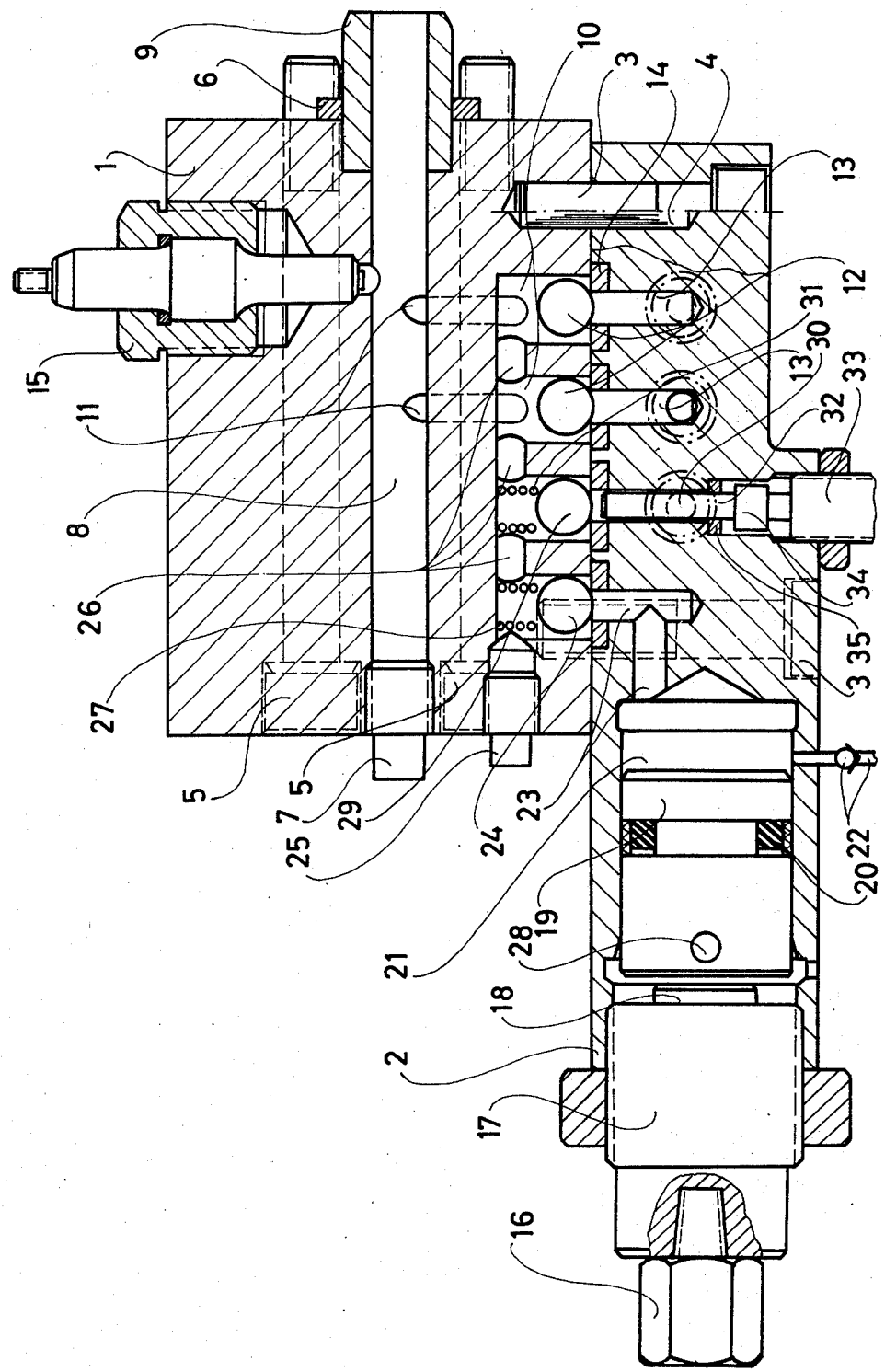

3,994,668

PROTECTIVELY DOUSED VALVING DEVICE FOR A COMBUSTION CHAMBER

CROSS REFERENCE TO RELATED APPLICATION

U.S. Ser. No. 604,490, filed Aug. 14, 1975. Inventor: Ernst Leisner (claiming priority of German Application No. P 24 40 040.6 of Aug. 21, 1974).

This invention relates to a valving device for closing off the inlet valves of a combustion chamber during a combustion reaction. It is particularly applicable to the combustion chamber of a machine for thermal deburring of work pieces, although in principle it is also useful in other analogous machines, for example gas motors. In general the invention is applicable to valving devices having a casing with a bore through which a combustion gas mixture is admitted into a combustion chamber after passing through one or more valves controlling the admission of the individual component gases.

In machines for thermal deburring, for which the present invention is particularly intended, the combustion gas mixture is frequently a mixture of hydrogen and oxygen. In such a machine hydrogen and oxygen, for example, are each sucked into a pressure cylinder from the supply tank or admitted into the pressure cylinder under the pressure of the supply tank, in order to be provided under substantial compression, up to 100 atm. to the combustion chamber. In the combustion chamber the gas mixture is ignited and detonates in an explosive fashion. When that happens, for a very short time there are temperatures up to several thousand degrees Centigrade, at which the undesired burrs of the articles being treated melt away or or burned off by the effect of a certain excess of oxygen in the gas mixture.

The explosion-like detonation, in addition to producing a further increase in pressure, also imposes a notable temperature stress which should be kept away from the piping connecting the pressure cylinder and the combustion chamber, wherefor a valving device is usually provided between the respective pressure cylinders for the gases being supplied and the common duct leading to the combustion chamber. The valves of the valving device interrupt or close off the connecting piping during the explosion-like combustion process.

In the valving devices heretofore known for the purpose just described, a displaceable valve stem is movably seated in an individual bore for each component of the gas mixture to be pumped and burned. In one end position the valve stem clears the way for passage of gas into the combustion chamber and in its other end position it blocks the passage of gas by pressing a spherical valve surface against the valve seat under the application of an external force comparable in magnitude to the pressure acting from within the combustion chamber during the combustion process. It is usual for safety reasons to provide such a valve in the casing for each component of the gas mixture, so that the gas mixture is formed only in the delivery tube or bore of the device, that is, on the combustion chamber side of the valves.

In consequence of the high stressing of this valve as mentioned above, considerable difficulties have been found in designing and constructing the valves for relatively long-term operating reliability and up to now it has not been possible to avoid the difficulties with the known forms of valves. Thus leakages appear in the valve seat as the result of contamination which rapidly grow and lead to unusability of the valves, mainly as the result of high-temperature stresses.

It is accordingly an object of the present invention to simplify valving devices of the general type above discussed and nevertheless at the same time to reduce the stresses applied to the valves. It is a further object of the invention to reduce the stresses on the valves by practically entirely freeing the valves from temperature stresses proceeding outwards from the combustion chamber during the combustion process, so that minor short-comings in tightness of closure caused by contamination can no longer endanger the reliability and operability of the valving device. The invention is furthermore intended to reach these objectives by simple and economic measures, particularly by approaches that make it possible to affect two or more valves at the same time in a single operation or procedure.

SUMMARY OF THE INVENTION

Briefly, the valve or valves to be protected is or are located below the mixing bore in the casing of the valving device, being in each case connected to that bore by a substantially vertical channel. After the combustion chamber is charged with combustion mixture and before the ignition of the mixture, an additional valve is opened and the vertical channels between the valves and the mixing bore are filled with a measured dose of a liquid that is substantially inert with respect to the combustion gas through a bore opening into the vertical channel or channels of the valve or valves to be protected.

By this procedure and arrangement, during the time required for the combustion process, a blockage can be provided between the valve or valves and the bore connecting directly with the combustion chamber by the interposition of an inert liquid which is typically water, so that the high temperatures that appear only for a very short time are not transmitted or are absorbed and the transmission of the pressure shock wave from the combustion chamber produced by the combustion process is met by the development of a vaporization effect that protects the valve or valves. Furthermore, the valves under these conditions are no longer directly in contact with the gas mixture on the combustion chamber side of the valve, so that the combustion mixture cannot have a burning effect on the valves.

It is also possible in the application of the invention to make the valves themselves comparatively much simpler and nevertheless still reliable in operation by providing the valves as ball valves or the like opening upon the pressure of arriving combustion gas or water, as the case may be, and that at least the valve body of the valve serving for supplying water is subjected to the force of a closing spring supported on the casing for exterting its force.

In this case all of the precautions heretofore necessary to hold the valve closed during the combustion process against the pressure wave produced by the onset of combustion, since after the filling of the combustion chamber and during the combustion process it is pressed against its seat by the pressure applied from the combustion chamber side. Only for the valve body of the water supply valve is a certain minimum closing force applied by a spring desirable, in order to prevent an undesired flow of water into the combustion chamber before its filling with combustion gas.

It has been found advantageous to provide for the introduction of the water by a dosing pump driven hydraulically, pneumatically or mechanically, preferably a piston pump. In that manner the amount of the water filling to be provided for the time during each combustion operation can be adjusted to a minimum that is set by the construction dimensions, thus avoiding the possibility of occasional undesirable water overflow.

For the operation of the dosing pump, furthermore, it has been found particularly simple to provide for the automatic loading of the dosing pump with water available at the usual water supply pressure upon the backward movement of the piston. In that case, then, the closing spring operating on the valve body of the water supply valve must exert at least a force capable of opposing the water supply pressure.

The amount of water brought in through the valves measured out before each combustion operation does not require any special removal before the next combustion operation on account of the relatively small amount, since upon filling of the combustion chamber for the next combustion operation the water can be partly blown into the combustion chamber without thereafter influencing the combustion. Of course an additional mechanical, hydraulic or pneumatic valve can be provided which in its open position will connect the bore or the vertical channels directly or indirectly to a return line for the combustion gas and/or the water. Such a valve can have its valve body subjected to the force of a closure spring arranged on the combustion chamber side and utilizing the common casing for its fixed support. These measures are especially useful as precautions for the now and then occurring case in which on account of some disturbance of the operation an already prepared combustion does not take place, so that the combustion chamber must be emptied and these arrangements can also regularly serve to remove the water dose after the combustion operation for the combustion chamber is again filled with gas.

It is finally been found particularly useful to arrange all the valves in a row directed substantially parallel to the mixing bore and underneath the latter in the mixing block casing and to provide valve chambers or bores on the combustion chamber side of the valve bodies which are connected together by a bore leading from the flooding valve. In this manner a particularly compact form of construction results requiring the provision of relatively few bores or channels.

The invention is further described by way of example with reference to the accompanying drawing which shows a cross section of a valving device embodying the present invention.

The valve casing is composed of housing portions 1 and 2 that are connected together by screws 3 and fitting pins 4. The screw 3 and the pin 4 shown at the right of the drawing of course are located next to each other in spaced relation, and they are brought together in the drawing plane only for purposes of illustration.

The casing is connected with the wall (not shown) of a combustion chamber, disposed on the right in the drawing, of a thermal deburring machines by screws 5 passing completely through the casing portion 1 cooperating with a gas-tight seal 6. A gas supply bore 8 closed at its end opposite the combustion chamber with a threaded plug 7 communicates with the combustion chamber through a mouth piece 9 which extends in one direction into the casing portion 1 and in the other direction into the combustion chamber wall not shown in the drawing, for the purpose of increasing the tightness of the joint, particularly by protection of the seal 6.

Underneath the bore 8 the casing portion 1 has substantially vertical valve bores 10 that are connected through likewise vertical channels 11 with the bore 8. The valve balls 12, located in the valve bores 10, are lifted off their respective seats formed by seals 14 by the arrival of gas over supply lines 13, the gas being for example hydrogen in one case and oxygen in the other. When the gas supply is interrupted by the build-up of gas pressure in the combustion chamber and thus also in the bore 8 and the channels 11, the valve balls are pressed into their closed position against the seals 14.

In order that the valves 12 and 14 should not be in the immediate vicinity of a combustion produced by a spark plug 15 seated in the bore 8, the valve bores 10 and the channels 11 are filled with water after the shutting off of the gas line and the initiation of the combustion process. For this purpose there is provided a hydraulically actuated piston and cylinder unit 17 of which the rod 18 connects to a piston 19 that moves in a cylinder cavity 21 formed in the casing portion 2 and is provided with a ring seal 20. When the cylinder-piston unit 17 is turned off, water at the water supply line pressure can flow through a check valve 22 into the cylinder cavity 21 and cause the piston 19, as well as the piston rod 18, to go back into the lefthand end position. If now hydraulic pressure is turned on in the cylinder-piston unit 17, the piston 19 pushes the water present in the cylinder cavity 21 through the bore 23 and the ball valve 24, which is open with flow in this direction, after which it flows through a bore 26 that has its far end closed by the threaded plug 25 to reach the valve bores 10 and the channels 11. In order that the valve 24 may not be able to open upon filling of the cylinder cavity 21 with water, that valve is subjected to the force of the spring 27 urging the valve into the closed position, pushing against the casing portion 1. The spring 27 has sufficient force to withstand the water line pressure.

For monitoring the operation of the cylinder-piston unit 17, the piston 19 can be provided on the dry side of the sealing ring 20 (the side away from the water) with a pin or pointer 28 extending at right angles to the plane of the drawing, which projects through a slot not shown in the drawing which is provided in the casing portion 2, so as to make the movement of the piston 19 visible.

In the normal case it is not necessary to release the water filling present in the valve bores 10 and in the channels 11 during the combustion process before the combustion chamber is again filled with gas through the bores 13, since the gas pulls the water into the combustion chamber where it immediately vaporizes, because the combustion chamber assumes an elevated temperature after a short period of operation of the machine.

If it should in a particular case be desired to release the water and/or the gas filling in the combustion chamber, as for example when the occurrence of an operation makes it desirable that the ignition of the gas present in the combustion chamber should not take place, an additional ball valve 29 can be provided through which the bore 26 and with it the combustion chamber as well as the valves 12 and 24 can be connected to a return line 30. Here again, by the effect of a spring 31, the ball valve 29 may be normally kept in the closed position against the gas pressure and the valve 29 can be opened by a rod 32 that can be actuated by a hydraulically operated cylinder-piston unit 33. The rod 32 has a smaller diameter than the bore guiding it between the valve 29 and the return line 30, so that the water or gas, as the case may be, can penetrate to the ring gap thus formed to the return line 30. The position of the rod 32 at the open position of the valve 29 is determined by a collar 34 abutting a seal 35, in order to prevent the introduction of leaks by the operation of the valve 29.

The valving device according to the invention is suited not only for application to machines for thermal deburring, as particularly featured herein, but rather widely applicable, wherever valves in the access piping of a combustion chamber are highly stressed, as for example is also the case with gas motors. It is clear that changes and modifications may be made within the inventive concept.

We claim:

1. A valving device for gas-tight closure of at least one connection to a combustion chamber during a combustion reaction comprising:
    a casing having a bore communicating with a combustion chamber;
    at least one valve located below said bore and communicating therewith through a vertical channel for supplying a combustion gas to said bore and combustion chamber, and
    means, including an additional valve and a channel connecting said valve with said vertical channel, for filling said vertical channel with a predetermined quantity of a liquid that is inert with respect to said combustion gas.

2. A valving device as defined in claim 1, in which said means for filling said vertical channel with liquid is a means for filling them with a predetermined quantity of water.

3. A valving device as defined in claim 1, in which said valves are ball valves and that at least said additional valve is subject to the pressure of a closing spring supported against said casing.

4. A valving device as defined in claim 1, in which said means for filling said vertical channel with liquid comprises a dosing pump.

5. A valving device as defined in claim 4, in which said dosing pump is a piston pump.

6. A valving device as defined in claim 5, in which the cylinder cavity of said dosing pump is so constructed as to be filled automatically with water provided under water supply pressure upon the backward movement of the piston of said dosing pump and in which, further, said closing spring exerts a force on the valve body of said additional valve that is at least sufficient to withstand the water supply pressure.

7. A valving device as defined in claim 1, in which there are also provided a second additional valve having a valve body spring-pressed by closing spring means situated on the combustion chamber side of said second additional valve braced against said casing, means for connection said vertical channel through said second additional valve directly or indirectly to a return flow line, and means for actuating said second additional valve to open it for a period following completion of a combustion operation.

8. A valving device as defined in claim 7, in which all said valves are arranged below said bore in said casing one next to the other in a succession disposed in a direction parallel to the axis of said bore and in which the valve chambers or bores on the combustion chamber side of the valve bodies of said valves are connected together by a bore leading from said first additional valve serving for the provision of said inert liquid.

* * * * *